US011656326B2

(12) United States Patent
Berry et al.

(10) Patent No.: US 11,656,326 B2
(45) Date of Patent: May 23, 2023

(54) RADAR ELEVATION ANGLE MEASUREMENT

(71) Applicant: Argo AI, LLC, Pittsburgh, PA (US)

(72) Inventors: Jonathan C. Berry, San Jose, CA (US); Duc H. Vu, Sunnyvale, CA (US)

(73) Assignee: Argo AI, LLC, Pittsburgh, PA (US)

( * ) Notice: Subject to any disclaimer, the term of this patent is extended or adjusted under 35 U.S.C. 154(b) by 334 days.

(21) Appl. No.: 17/027,468

(22) Filed: Sep. 21, 2020

(65) Prior Publication Data

US 2022/0091229 A1    Mar. 24, 2022

(51) Int. Cl.
*G01S 7/40* (2006.01)
*G01S 13/08* (2006.01)
*G01S 13/931* (2020.01)

(52) U.S. Cl.
CPC .............. *G01S 7/40* (2013.01); *G01S 13/08* (2013.01); *G01S 13/931* (2013.01)

(58) Field of Classification Search
CPC ....................................................... G01S 7/40
See application file for complete search history.

(56) References Cited

U.S. PATENT DOCUMENTS

| | | | |
|---|---|---|---|
| 6,363,619 | B1 | 4/2002 | Schirmer et al. |
| 10,241,198 | B2 | 3/2019 | LaChapelle et al. |
| 10,291,904 | B2 | 5/2019 | Finn et al. |
| 2007/0241962 | A1 | 10/2007 | Shinoda et al. |
| 2015/0006074 | A1 | 1/2015 | Le Scouarnec et al. |

(Continued)

FOREIGN PATENT DOCUMENTS

| CN | 104777462 A | * | 7/2015 | ............... G01S 7/38 |
|---|---|---|---|---|
| CN | 208076709 U | | 11/2018 | |

(Continued)

OTHER PUBLICATIONS

Kim et al. "Beam Expansion of Blind Spot Detection Radar Antennas Using a Radome with Defected Corrugated Inner Wall", International Journal of Antennas and Propagation, Dec. 10, 2017, pp. 1-13, vol. 2017, Republic of Korea.

(Continued)

*Primary Examiner* — Erin F Heard
*Assistant Examiner* — Hailey R Le
(74) *Attorney, Agent, or Firm* — Fox Rothschild, LLP (57) ABSTRACT

An object of the present invention is to provide a method capable of calibrating a sensor function required in a safety design of a radar safety sensor in real time.
A calibration station (11) is provided on a traveling route of an unmanned vehicle (1) on which a safety sensor (3) for detecting an obstacle (2) ahead is mounted, and a standard reflection is provided at a position of a maximum measurement distance (L) of the safety sensor (3) at the calibration station (11). Prior to normal traveling of the unmanned trolley 1, the unmanned trolley 1 is moved to the calibration station 11 in advance, and the reference value obtained by measuring the standard reflector 12 with the safety sensor 3 is taught, During normal operation of the unmanned trolley 1, every time the unmanned trolley 1 reaches the calibration station 11, the measured value obtained by measuring the standard reflector 12 by the safety sensor 3 is compared with a reference value. Calibrate the sensor function of FIG. 1.

18 Claims, 6 Drawing Sheets

(56) References Cited

U.S. PATENT DOCUMENTS

| | | | |
|---|---|---|---|
| 2015/0070207 A1* | 3/2015 | Millar | G01S 13/4454 |
| | | | 342/174 |
| 2017/0212215 A1* | 7/2017 | Hellinger | G01S 13/931 |
| 2019/0072650 A1 | 3/2019 | Tatipamula et al. | |
| 2019/0339368 A1 | 11/2019 | Berger et al. | |
| 2020/0150224 A1 | 5/2020 | Cejka et al. | |
| 2022/0026177 A1* | 1/2022 | Cederwall | F41G 3/2655 |
| 2022/0373645 A1* | 11/2022 | Travnikar | G01S 13/867 |

FOREIGN PATENT DOCUMENTS

| | | |
|---|---|---|
| DE | 102018130867 A1 | 6/2020 |
| JP | 2004003987 A | 1/2004 |
| WO | 0157551 A1 | 8/2001 |
| WO | 2016025683 A1 | 2/2016 |
| WO | WO-2021046797 A1 * | 3/2021 |

OTHER PUBLICATIONS

Alvarez et al. "Calibration Technique for Polarization-Sensitive LIDARs", Journal of Atmospheric and Oceanic Technology, May 2006, pp. 683-699, vol. 23, American Meteorological Society, United States.

Kaasalainen et al. "Radiometric Calibration of LIDAR Intensity With Commercially Available Reference Targets", IEEE Transactions on Geo-science and Remote Sensing, Feb. 2009, pp. 588-598, vol. 47, issue 2, IEEE Xplore.

Extended European Search Report of European application No. 21197683.2 dated Feb. 8, 2022, 8 pages.

\* cited by examiner

RADAR ELEVATION ANGLE MEASUREMENT

TECHNICAL FIELD

This disclosure generally relates to systems and methods for radar elevation angle measurement.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise radars, visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle.

However, disoriented sensors may capture unreliable data. Therefore, there is a need to enhance the proper orientation of sensors to ensure that captured data does not undermine the sensor system performance.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include LIDAR sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, sensors such as radar rely on the accurate detection of signals reflected from objects in the vicinity of the autonomous vehicle. A problem may exist in the uncertainty of radar elevation angle detection when it is mounted, for example, to a vehicle. Radar alignment uncertainty can lead to radar data uncertainty. For example, an accurate radar elevation angle helps to detect objects at a distance optimal for that radar. However, if radar elevation angle detection is flawed due to being off by some degrees, objects will be detected at a reduced distance. Azimuthal alignment errors can be detected with direct radar Angle-of-Arrival direction estimation right out of the radar when a particular target's relative angle is already known. Other means of measuring a radar elevation angle (also known as a radar pitch angle) may include measurements by some means of laser scanning or some mechanical measurement. However, that is feasible when the radar is not covered by a fascia or other vehicle material. It is an objective to measure and elevation angle of the radar without making changes to the vehicle. It is desirable to determine a radars elevation angle by analyzing the radar output with its surrounding.

Example embodiments described herein provide certain systems, methods, and devices for radar elevation angle measurement.

In one or more embodiments, a radar elevation angle measurement system may facilitate means of measuring radar elevation angle, using first a radar observed external stimulus, followed by automated radar data post-processing.

In one or more embodiments, a radar elevation angle measurement system may facilitate the use of a reflection structure composed of a series of corner reflectors placed at different elevations on the device. A corner reflector consists of three mutually perpendicular, intersecting flat surfaces, which reflects waves directly towards the source, but translated. The three intersecting surfaces often have square shapes. Radar corner reflectors made of metal are used to reflect radio waves from radar sets. Optical corner reflectors, called corner cubes, made of three-sided glass prisms, are used in surveying and laser ranging. When the corner reflector is not directly facing the radar, and as the corner reflector turns away from the radar, it causes the corner reflector to turn off because it becomes far less reflecting.

In one or more embodiments, a radar elevation angle measurement system may facilitate the use of a reflection structure that has individual corner reflectors with a front reflected face and a back that is covered with anechoic foam to absorb radio waves or signals received from a radar. Each of the corner reflectors may be controlled by a motor that controls the longitudinal rotation of the corner reflector around an azimuth axis. The reflection structure may be a series of motor mounted corner reflectors with anechoic foam placed around them except for the reflective surfaces. Each of the corner reflectors may be placed at a different height along the center pole of the reflection structure. A computer system may control the rotation of each motor to control which side is facing the radar. Whenever a corner reflector is facing the radar, echo signals are reflected back to the radar. In contrast, whenever the back surface of a corner reflectors space in the radar, radar signals are absorbed by the back surface.

In one or more embodiments, a radar elevation angle measurement system may facilitate starting with all anechoic foam sides (back surfaces) of the corner reflectors facing the radar such that the radar sees nothing since its signals are not being reflected back from the anechoic foam sides. A radar elevation angle measurement system may then sequentially turn each corner reflector around such that data may be captured by the radar, where the data may be based on the reflected waves from each of the corner reflectors. The collected radar detection data may be used to find the corner reflectors because other objects in the vicinity of the radar may also be reflecting waves back to the radar. A radar elevation angle measurement system may filter out the noise from surrounding objects reflecting back the waves by identifying the corner reflectors by looking for an equivalent pattern response. For example, the corner reflectors being rotated sequentially results in a series of steps from each of the corner reflectors. These steps may have different return signal levels. When these steps are plotted over a set of points, a curve may be fitted to those points. This curve may have a second-degree polynomial curve fit into it. Based on this second-degree polynomial curve, a peak may be determined. The peak may be used in order to determine the elevation angle of the radar. If the radar is not pointed directly to one of the corner reflectors, by curve fitting across the other corner reflectors returns, it may be determined where the radar is effectively pointed with respect to the reflection structure.

In one or more embodiments, a radar elevation angle measurement system may facilitate correlating the signal peaks with radar elevation angle may be based on the assumption that a sensitivity profile of a radar is roughly a smooth curve. The sensitivity curve in elevation of the radar may fall off the edges making it reasonably fit a second-degree polynomial. With this assumption, when a series of returns at different angles from a plurality of corner reflectors sequentially turning on and off, it is effectively like sampling different points on the sensitivity curve of the radar. Based on that, the peak point may be determined, which would correlate to the ideal pointing angle of the radar as it is situated. Ideally, the highest sensitivity is perpendicular to the face of the radar. That is, where the best range performance of the radar is achieved. For example, an object facing a radar at its highest sensitivity point may be detected by the radar easier than when the object is angled when facing the radar. That is because the radio waves are not directly reflected back to the radar when they reach the object.

In one or more embodiments, a radar elevation angle measurement system may determine the position of each of the corner reflectors. For example, a first corner reflector on the reflection structure may be located at a first distance and at a first height relative to the radar. Knowing that information for all the corner reflectors in addition to determining the peak signal values, the peak may then be converted into an angle. For example, if the peak signal value falls between two corner reflectors on the reflection structure, knowing the height above ground of the two corner reflectors and the radar, the elevation angle may be determined.

In one or more embodiments, a radar elevation angle measurement system may facilitate that instead of using a series of corner reflectors, one corner reflector may be used in conjunction with two motors. The first motor may control the elevation of the corner reflector, and the second motor may control the rotation of the corner reflector to transition it from an ON position to an OFF position. This mechanism would allow better sampling of the various points on the sensitivity curve of the radar because the elevation of the corner reflector may be varied at more controlled steps. Further, using this mechanism, a taller reflection structure may be used by simply selecting a longer center pole.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
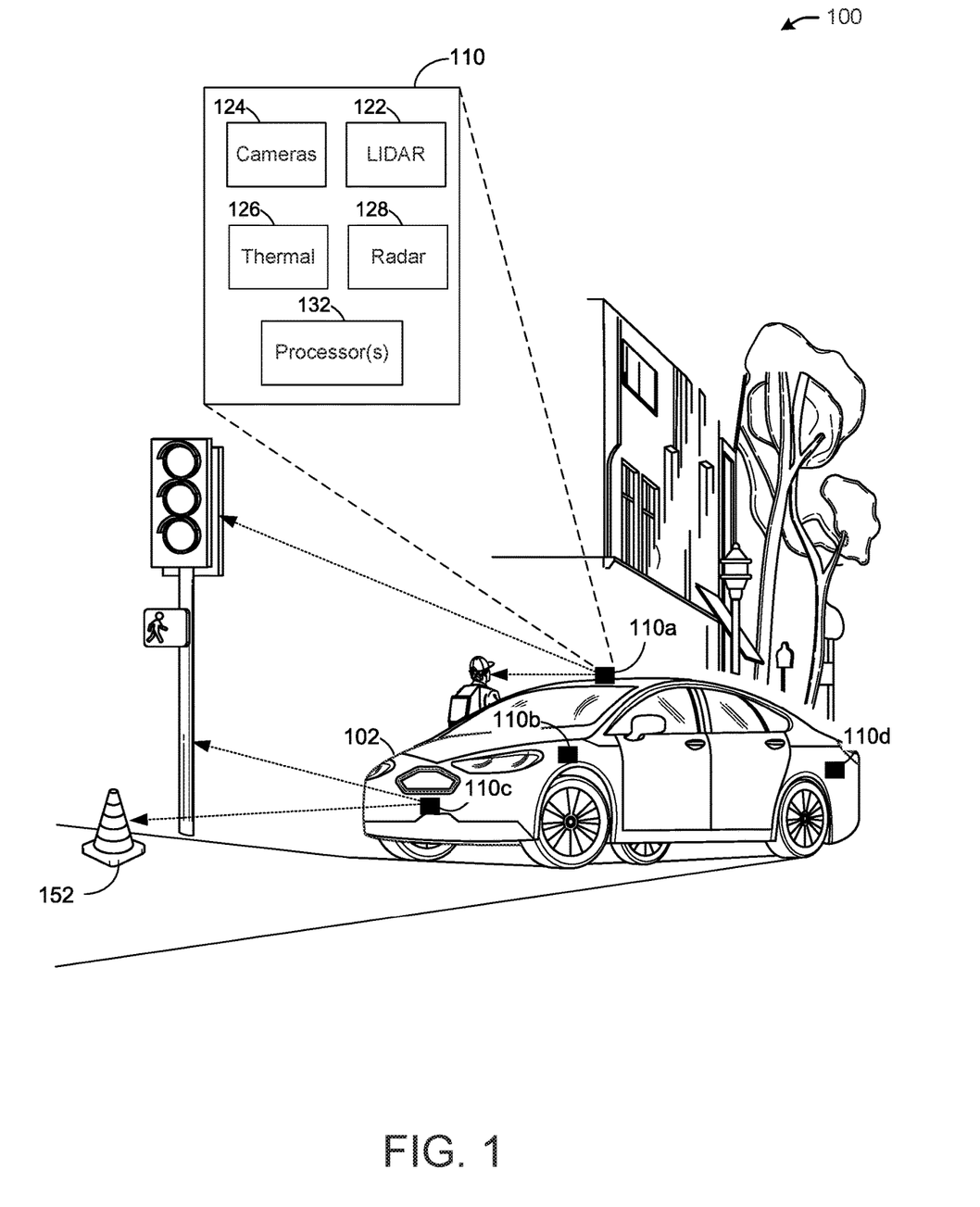
FIG. 1 illustrates an example environment of a vehicle, in accordance with one or more example embodiments of the present disclosure.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102. In this environment 100, there is shown that sensor system 110 includes sensors such as sensors 110a, 110b, 110c, and 110d. It should be noted that other sensors not shown in this figure may also be attached to the vehicle 102 and that the sensors 110a, 110b, 110c, and 110d are used for illustrative purposes. These sensors may detect objects (e.g., object 152) in the vicinity and around the vehicle 102. Other emitters and sensors in the sensor system 110 may transmit and/or receive one or more signals in order to detect, and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124, such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processor(s) 132. The one or more processor(s) 132 may control the transmission and reception of signals using the LIDAR 122, the cameras 124, the thermal sensor 126, and the radar 128. The various sensors of the sensor system 110, when calibrated correctly, should indicate a proper distance and shape of object 152. However, the vehicle 102 may be subjected to environmental conditions such as vibration, thermal shock, or similar conditions. Under such conditions, the various sensors of the sensor system 110 may fall out of alignment. This would result in the data received from these various sensors to be unreliable when processed by processor(s) 132.

It is understood that the above descriptions are for purposes of illustration and are not meant to be limiting.

Figure 2:
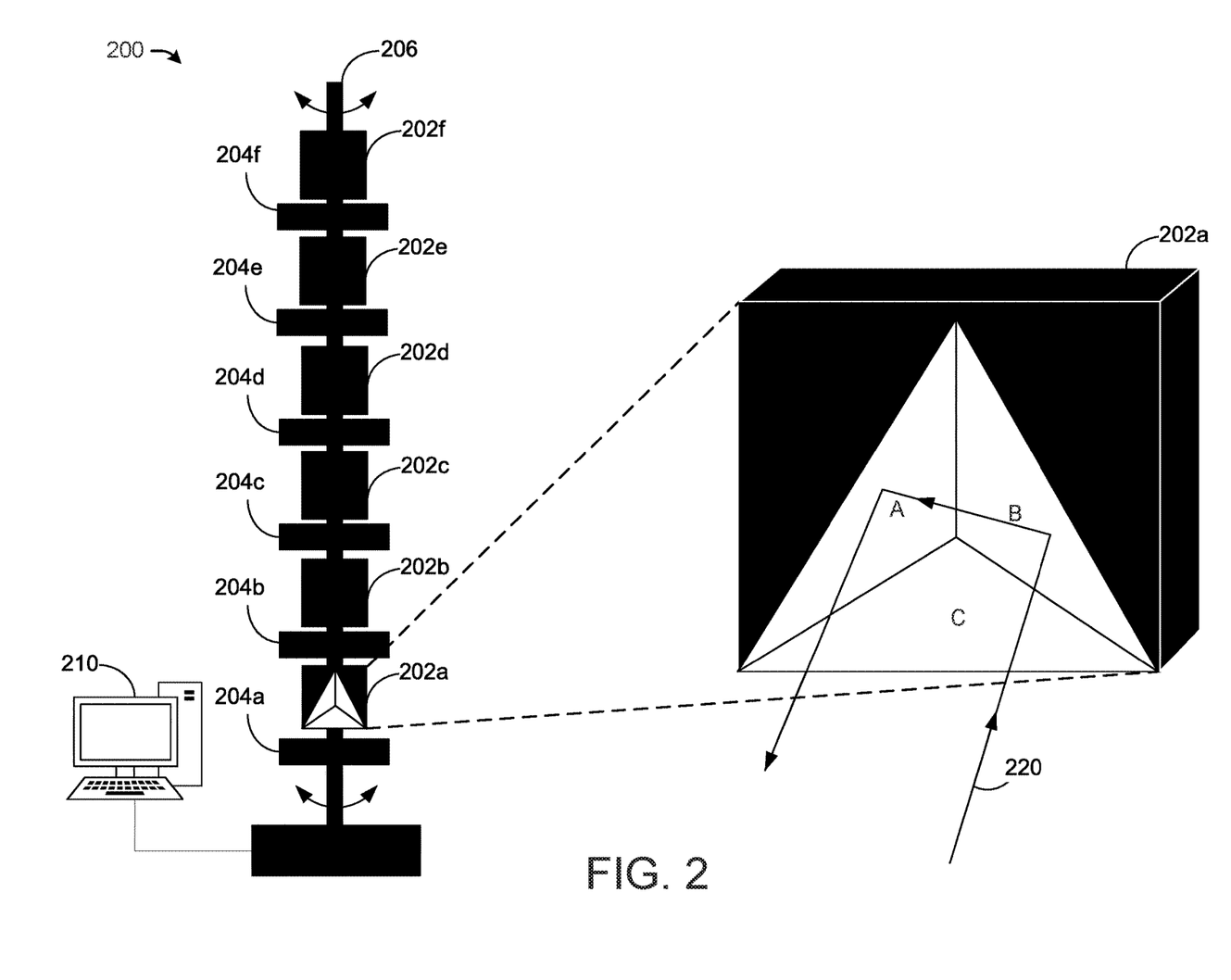
FIG. 2 depicts an illustrative schematic diagram for radar elevation angle measurement, in accordance with one or more example embodiments of the present disclosure.

FIG. 2 depicts an illustrative schematic diagram for radar elevation angle measurement, in accordance with one or more example embodiments of the present disclosure.

Referring to FIG. 2, there is shown a reflection structure 200 and is comprised of a plurality of corner reflectors (e.g., corner reflectors 202a-f). A center pole 206 may provide a rotational axis of these corner reflectors. Between each of the corner reflectors 202a-f, there may be a motor (e.g., motors 204a-f) that control the rotations around the center pole 206. The entire system may be controlled by a computer system 210 that may be capable of turning ON one of the corner reflectors while maintaining the others in an OFF position. Each of the corner reflectors 202a-f may comprise a front-facing surface and a back-facing surface. The front-facing surface may comprise the three reflective surfaces formed in perpendicular to each other in order to provide an efficient reflection of radio waves back to the radar. Looking at the exploded view of the corner reflector 202a, it can be seen that the front-facing surface includes three reflective surfaces A, B, and C. For example, the corner reflector 202a may have the front-facing surface directed towards the radar. The radar may transmit one or more signals (e.g., signal 220), which may bounce off of surface B, then hits surface A then gets reflected back towards the radar. The reflected or echoed signals may be received by the radar and interpreted to indicate that the corner reflector 202a is in an ON position. In another example, the corner reflector 202a may have its back facing surface pointed towards the radar. In that case, when the radar transmits a signal, that signal may hit the back facing surface, which is made up of anechoic foam, resulting in minimal to no reflective signals. The radar may determine that no signal is reflected back and may determine that the corner reflector 202a is in an OFF position.

In one or more embodiments, a radar elevation angle measurement system may facilitate that after the corner reflector 202a has switched from OFF to ON then to OFF, the motor 204b may then transition the corner reflector 202b to an ON position after being in an OFF position. In that case, only corner reflector 202b may have its front-facing surface directed towards the radar, while all the other corner reflectors may have their back facing surfaces directed towards the radar. Similarly and sequentially, each corner reflector transitions from an OFF to an ON position while others are in an OFF positions.

In one or more embodiments, each time a corner reflector reflects back signals from the radar, the radar may collect data associated with that signal. For example, the radar may collect signal to noise ratio (SNR) data associated with the reflected signals. The collected SNR data may be used to find the corner reflectors because other objects in the vicinity of the radar may also be reflecting waves back to the radar. A radar elevation angle measurement system may filter out noise from surrounding objects reflecting back the waves. This may be achieved by identifying the corner reflectors by looking for an equivalent pattern response. For example, the corner reflectors being rotated sequentially results in a series of steps from each of the corner reflectors. These steps may have different return signal levels. When these steps are plotted over a set of points, a curve may be fitted to those points. This curve may have a second-degree polynomial curve fit into it. Based on this second-degree polynomial curve, a peak may be determined. The peak may be used in order to determine the elevation angle of the radar. If the radar is not pointed directly to one of the corner reflectors, by curve fitting across the other corner reflectors returns, it may be determined where the radar is effectively pointed with respect to the reflection structure.

In one or more embodiments, a radar elevation angle measurement system may facilitate correlating the signal peaks with radar elevation angle may be based on the assumption that a sensitivity profile of a radar is roughly a smooth curve. The sensitivity curve in elevation of the radar may fall off the edges making it reasonably fit a second-degree polynomial. With this assumption, when a series of returns at different angles from a plurality of corner reflectors sequentially turning ON and OFF, it is effectively like sampling different points on the sensitivity curve of the radar. Based on that, the peak point may be determined, which would correlate to the ideal pointing angle of the radar as it is situated. Ideally, the highest sensitivity is perpendicular to the face of the radar. That is, where the best range performance of the radar is achieved.

It is understood that the above descriptions are for purposes of illustration and are not meant to be limiting.

Figure 3:
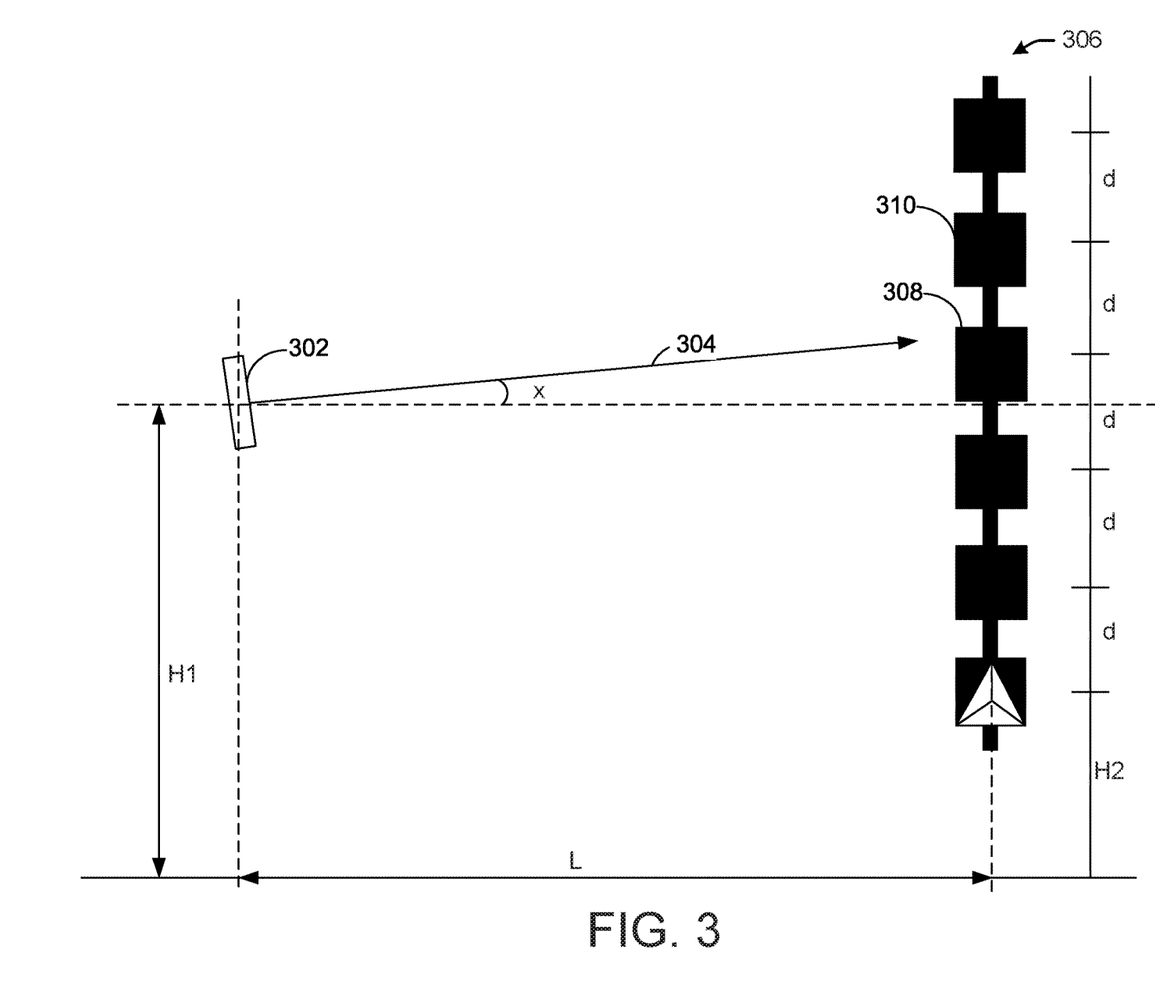
FIG. 3 depicts an illustrative schematic diagram for radar elevation angle measurement, in accordance with one or more example embodiments of the present disclosure.

FIG. 3 depicts an illustrative schematic diagram for radar elevation angle measurement, in accordance with one or more example embodiments of the present disclosure.

Referring to FIG. 3, there is shown a radar 302 pointed towards a reflection structure 306. The reflection structure 306 may be similar to the reflection structure 206 of FIG. 2. As described in FIG. 2, each of the corner reflectors of the reflection structure 306 may either be an ON position or an OFF position. Only one corner reflector structure may be in the ON position while the rest of the corner reflectors are in the OFF position. After determining the peak signal value from SNR data collected by the radar from the reflected signal of each of the corner reflectors when they are in the ON position, a radar elevation angle measurement system may calculate a radar elevation angle based on the peak signal value and based on location information associated with the radar 302 and the reflection structure 306. For example, the radar 302 may be affixed at a specific height (e.g., H1) while being pointed at an unknown angle. Further, the radar 302 may be placed at a distance L from the reflection structure 306. The reflection structure 306 may have the bottom corner reflector elevated at a height H2, and all the other corner reflectors are equidistant from each other by a distance d. That information may be known to the radar elevation angle measurement system such that the radar elevation angle measurement system may convert the peak signal values to a radar elevation angle x. The peak signal value may be correlated to a direction 304. Direction 304 may fall between corner reflector 308 and corner reflector 310. Knowing that direction and knowing the various distances and heights, a radar elevation angle measurement system may determine the radar elevation angle.

It is understood that the above descriptions are for purposes of illustration and are not meant to be limiting.

Figure 4:
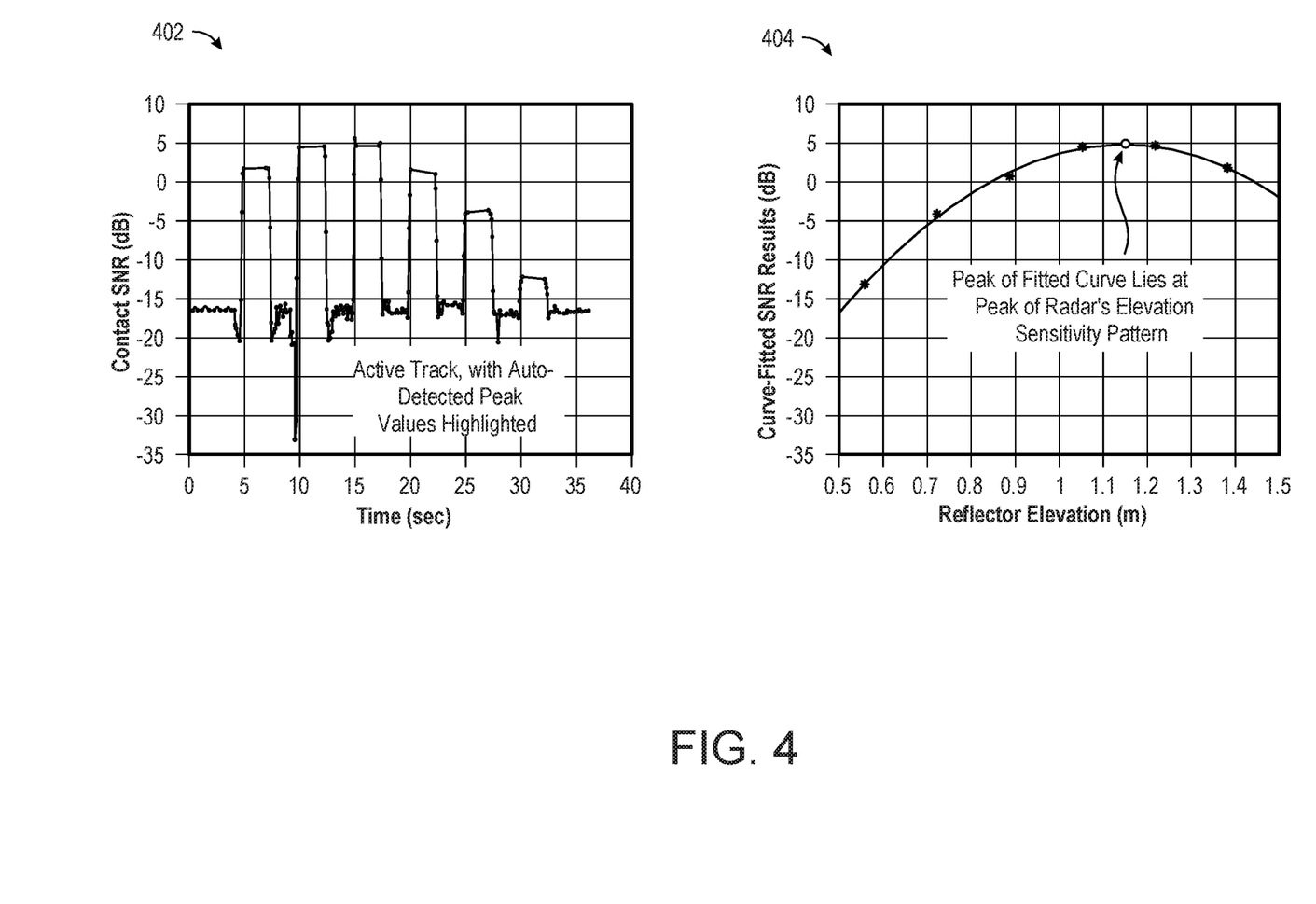
FIG. 4 depicts an illustrative schematic diagram for radar elevation angle measurement, in accordance with one or more example embodiments of the present disclosure.

FIG. 4 depicts an illustrative schematic diagram for radar elevation angle measurement, in accordance with one or more example embodiments of the present disclosure.

Referring to FIG. 4, there is shown a diagram 402 and diagram 404. Diagram 402 shows the series of detected steps determined based on the reflected signals from the various corner reflectors. In diagram 402, six steps correlate to six corner reflectors when they are in an ON position. As can be seen in diagram 402, each corner reflector reflects the signals at SNR values based on the location and height of each corner reflector.

Referring to diagram 404, when these detected steps are plotted over a set of points, a curve may be fitted to those points. This curve may have a second-degree polynomial curve fit into it. Based on this second-degree polynomial curve, a peak may be determined. The peak may be used in order to determine the elevation angle of the radar. If the radar is not pointed directly to one of the corner reflectors, by curve fitting across the other corner reflectors returns, it may be determined where the radar is effectively pointed with respect to the reflection structure.

It is understood that the above descriptions are for purposes of illustration and are not meant to be limiting.

Figure 5:
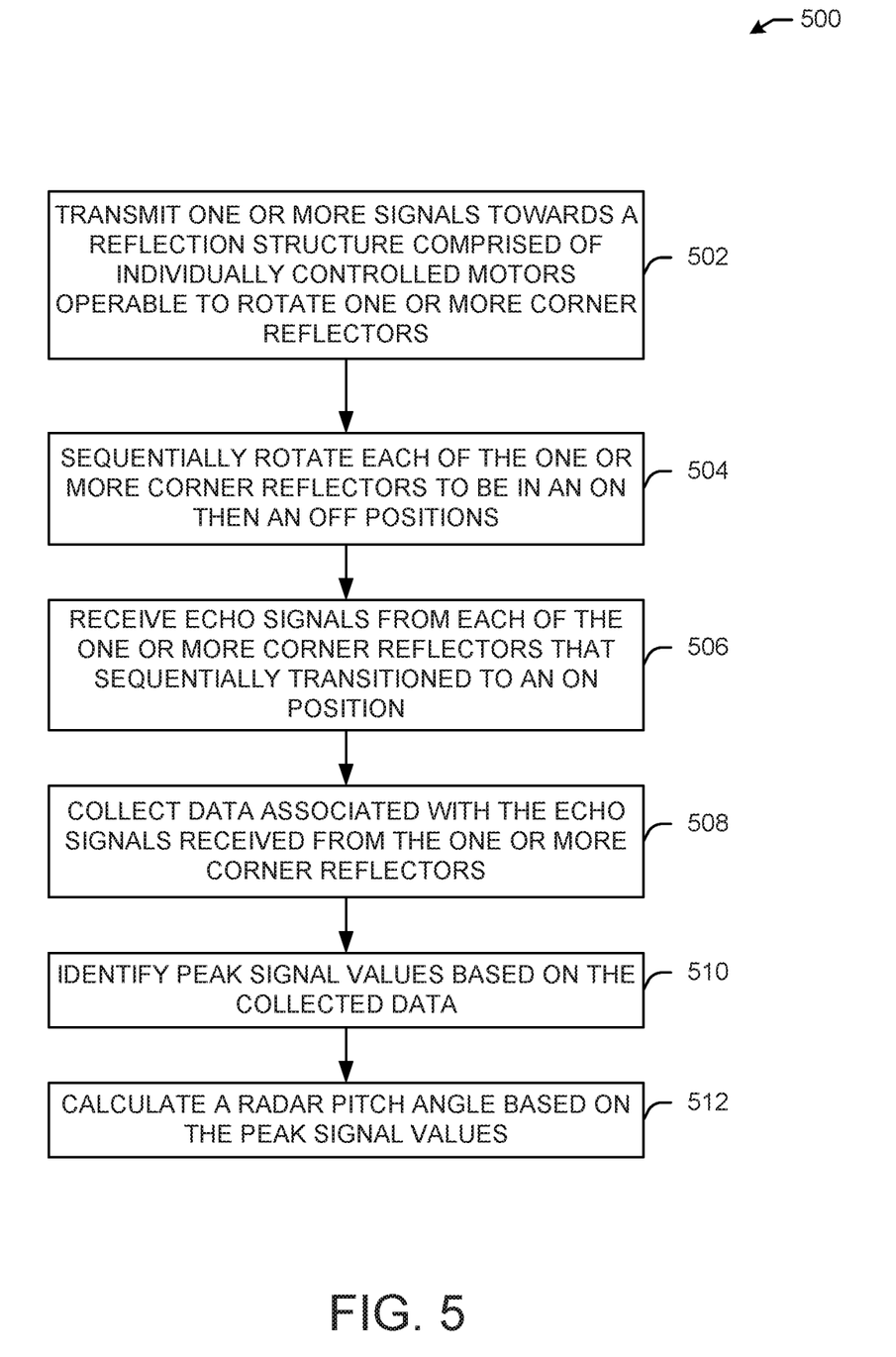
FIG. 5 illustrates a flow diagram of a process for an illustrative radar elevation angle measurement system, in accordance with one or more example embodiments of the present disclosure.

FIG. 5 illustrates a flow diagram of process 500 for an illustrative radar elevation angle measurement system, in accordance with one or more example embodiments of the present disclosure.

At block 502, a radar elevation angle measurement system may transmit one or more signals from a radar towards a reflection structure comprised of individually controlled motors operable to rotate one or more corner reflectors. Each of the one or more corner reflectors comprises a front surface and a back surface, wherein the front surface comprises two or more reflective surfaces, and wherein the back surface comprises anechoic foam.

At block 504, the radar elevation angle measurement system may receive echo signals at the radar from each of the one or more corner reflectors that sequentially transitioned to an ON position based on each of the one or more corner reflectors being sequentially rotated to be in an ON then an OFF positions. To sequentially rotate each of the one or more corner reflectors comprises transitioning a first corner reflector from an OFF position to an ON position while the rest of the one or more corner reflectors are maintained in an OFF position.

At block 506, the radar elevation angle measurement system may collect data associated with the echo signals received from the one or more corner reflectors.

At block 508, the radar elevation angle measurement system may identify peak signal values based on the collected data. The peak signal values are determined by sampling different points on a sensitivity curve of the radar. The collected data may be signal to noise ratio (SNR) data. The peak signal values indicate a high radar sensitivity.

At block 510, the radar elevation angle measurement system may calculate a radar pitch angle of the radar based on the peak signal values. The radar pitch angle may be calculated based on a height and a distance to the each of the one or more corner reflectors. The radar pitch angle may be associated with an optimal range of the radar.

It is understood that the above descriptions are for purposes of illustration and are not meant to be limiting.

Figure 6:
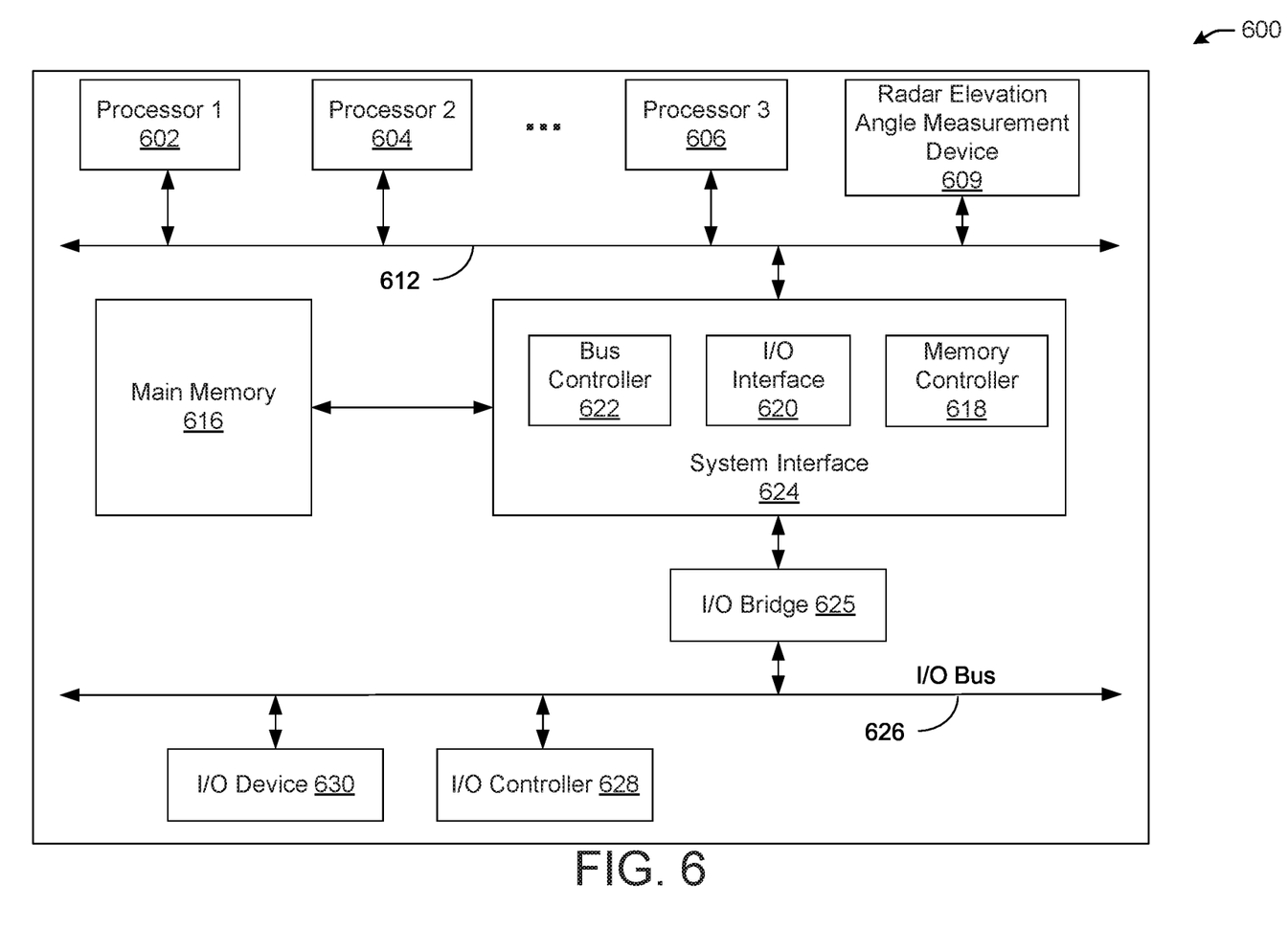
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent one or more processor(s) 132 and/or the computer system 210 of FIG. 2, and therefore may assess and validate the sensors in the sensor system 110 of FIG. 1. The computer system (system) includes one or more processor(s) 602-606. Processor(s) 602-606 may include one or more internal levels of cache (not shown) and a bus controller (e.g., bus controller 622) or bus interface (e.g., I/O interface 620) unit to direct interaction with the processor bus 612. A radar elevation angle measurement device 609 may also be in communication with the processor(s) 602-606 and may be connected to the processor bus 612.

Processor bus 612, also known as the host bus or the front side bus, may be used to couple the processor(s) 602-606, and/or the radar elevation angle measurement device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridge(s) 625 or I/O device(s) 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processor(s) 602-606 and/or the radar elevation angle measurement device 609. Another type of user input device includes cursor control, such as a mouse, a trackball, or cursor direction keys for communicating direction information and command selections to the processor(s) 602-606 and/or the radar elevation angle measurement device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processor(s) 602-606, and/or the radar elevation angle measurement device 609. Main memory 616 also may be used for storing temporary variables or other intermediate information during execution of instructions by the processor(s) 602-606, and/or the radar elevation angle measurement device 609. System 600 may include read-only memory (ROM) and/or other static storage device coupled to the processor bus 612 for storing static information and instructions for the processor(s) 602-606, and/or the radar elevation angle measurement device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processor(s) 602-606, and/or the radar elevation angle measurement device 609 to perform the process steps described herein. In alternative embodiments, circuitry may be used in place of or in combination with the software instructions. Thus, embodiments of the present disclosure may include both hardware and software components.

The processor(s) 602-606, and/or the radar elevation angle measurement device 609 may transmit one or more signals towards a reflection structure comprised of individually controlled motors operable to rotate one or more corner reflectors.

The processor(s) 602-606, and/or the radar elevation angle measurement device 609 may sequentially rotate each of the one or more corner reflectors to be in an ON then an OFF positions.

The processor(s) 602-606, and/or the radar elevation angle measurement device 609 may receive echo signals from each of the one or more corner reflectors that sequentially transitioned to an ON position.

The processor(s) 602-606, and/or the radar elevation angle measurement device 609 may collect data associated with the echo signals received from the one or more corner reflectors;

The processor(s) 602-606, and/or the radar elevation angle measurement device 609 may identify peak signal values based on the collected data.

The processor(s) 602-606, and/or the radar elevation angle measurement device 609 may calculate a radar pitch angle based on the peak signal values.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In one or more embodiments, a device comprising processing circuitry coupled to storage, the processing circuitry may be configured to: transmit one or more signals towards a reflection structure comprised of individually controlled motors operable to rotate one or more corner reflectors; sequentially rotate each of the one or more corner reflectors to be in an ON then an OFF positions; receive echo signals from each of the one or more corner reflectors that sequentially transitioned to an ON position; collect data associated with the echo signals received from the one or more corner reflectors; identify peak signal values based on the collected data; and calculate a radar pitch angle based on the peak signal values. To sequentially rotate each of the one or more corner reflectors further comprises the processing circuitry being configured to transition a first corner reflector from an OFF position to an ON position while the rest of the one or more corner reflectors are maintained in an OFF position. Each of the one or more corner reflectors comprises a front surface and a back surface, wherein the front surface comprises two or more reflective surfaces, and wherein the back surface comprises anechoic foam. The radar pitch angle may be calculated based on a height and a distance to the each of the one or more corner reflectors. Example 5 may include the device of example 1 and/or some other example herein, wherein the radar pitch angle may be associated with an optimal range of the radar. The peak signal values are determined by sampling different points on a sensitivity curve of the radar. The collected data may be signal to noise ratio (SNR) data. The peak signal values indicate a high radar sensitivity.

In one or more embodiments, a non-transitory computer-readable medium storing computer-executable instructions which when executed by one or more processors result in performing operations comprising: transmitting one or more signals towards a reflection structure comprised of individually controlled motors operable to rotate one or more corner reflectors; causing to sequentially rotate each of the one or more corner reflectors to be in an ON then an OFF positions; receiving echo signals from each of the one or more corner reflectors that sequentially transitioned to an ON position; collecting data associated with the echo signals received from the one or more corner reflectors; identifying peak signal values based on the collected data; and calculating a radar pitch angle based on the peak signal values. To sequentially rotate each of the one or more corner reflectors further comprises the processing circuitry being configured to transition a first corner reflector from an OFF position to an ON position while the rest of the one or more corner reflectors are maintained in an OFF position. Each of the one or more corner reflectors comprises a front surface and a back surface, wherein the front surface comprises two or more reflective surfaces, and wherein the back surface comprises anechoic foam. The radar pitch angle may be calculated based on a height and a distance to the each of the one or more corner reflectors. The radar pitch angle may be associated with an optimal range of the radar. The peak signal values are determined by sampling different points on a sensitivity curve of the radar. The collected data may be signal to noise ratio (SNR) data. The peak signal values indicate a high radar sensitivity.

In one or more embodiments, a method may comprise: transmitting, by one or more processors, one or more signals towards a reflection structure comprised of individually controlled motors operable to rotate one or more corner reflectors; causing to sequentially rotate each of the one or more corner reflectors to be in an ON then an OFF positions; receiving echo signals from each of the one or more corner reflectors that sequentially transitioned to an ON position; collecting data associated with the echo signals received from the one or more corner reflectors; identifying peak signal values based on the collected data; and calculating a radar pitch angle based on the peak signal values. To sequentially rotate each of the one or more corner reflectors further comprises the processing circuitry being configured to transition a first corner reflector from an OFF position to an ON position while the rest of the one or more corner reflectors are maintained in an OFF position. Each of the one or more corner reflectors comprises a front surface and a back surface, wherein the front surface comprises two or more reflective surfaces, and wherein the back surface comprises anechoic foam. The radar pitch angle may be calculated based on a height and a distance to the each of the one or more corner reflectors. The radar pitch angle may be associated with an optimal range of the radar. The peak signal values are determined by sampling different points on a sensitivity curve of the radar. The collected data may be signal to noise ratio (SNR) data. The peak signal values indicate a high radar sensitivity.

In one or more embodiments, an apparatus comprising means for: transmit one or more signals towards a reflection structure comprised of individually controlled motors operable to rotate one or more corner reflectors; sequentially rotate each of the one or more corner reflectors to be in an ON then an OFF positions; receive echo signals from each of the one or more corner reflectors that sequentially transitioned to an ON position; collect data associated with the echo signals received from the one or more corner reflectors; identify peak signal values based on the collected data; and calculate a radar pitch angle based on the peak signal values. To sequentially rotate each of the one or more corner reflectors further comprises the processing circuitry being configured to transition a first corner reflector from an OFF position to an ON position while the rest of the one or more corner reflectors are maintained in an OFF position. Each of the one or more corner reflectors comprises a front surface and a back surface, wherein the front surface comprises two or more reflective surfaces, and wherein the back surface comprises anechoic foam. The radar pitch angle may be calculated based on a height and a distance to the each of the one or more corner reflectors. The radar pitch angle may be associated with an optimal range of the radar. The peak signal values are determined by sampling different points on a sensitivity curve of the radar. The collected data may be signal to noise ratio (SNR) data. The peak signal values indicate a high radar sensitivity.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A radar elevation angle measurement system comprising processing circuitry coupled to storage, wherein the processing circuitry is configured to:
   transmit one or more signals from a radar towards a reflection structure comprised of a plurality of corner reflectors each including a front surface that reflects the one or more signals and a back surface that absorbs the one or more signals, wherein the reflection structure also comprises a plurality of motors for individually rotating each of the plurality of corner reflectors about an azimuth axis of the reflection structure, and wherein the plurality of corner reflectors are positioned at different vertical elevation levels along the reflection structure;
   receive echo signals at the radar from at least one of the plurality of corner reflectors that has been rotated to an ON position where the front surface is positioned toward the radar;
   collect data associated with the echo signals received from the at least one of the plurality of corner reflectors that has been rotated to the ON position;
   identify peak signal values based on the collected data; and calculate a radar pitch angle of the radar based on the peak signal values.

2. The radar elevation angle measurement of claim 1, wherein when the at least one of the plurality of corner reflectors is transitioned to the ON position the remaining plurality of corner reflectors are rotated to an OFF position where the back surface is positioned toward the radar.

3. The radar elevation angle measurement of claim 1, wherein the front surface comprises two or more reflective surfaces, and wherein the back surface comprises anechoic foam.

4. The radar elevation angle measurement of claim 2, wherein the radar pitch angle is calculated based on a height and a distance to the each of the one or more corner reflectors.

5. The radar elevation angle measurement of claim 1, wherein the peak signal values are determined by sampling different points on a sensitivity curve of the radar.

6. The radar elevation angle measurement of claim 1, wherein the collected data includes signal to noise ratio (SNR) data.

7. The radar elevation angle measurement of claim 1, wherein the peak signal values indicate a high radar sensitivity.

8. A non-transitory computer-readable medium storing computer-executable instructions which when executed by one or more processors result in performing operations comprising:
transmitting one or more signals from a radar towards a reflection structure comprised of a plurality of corner reflectors each including a front surface that reflects the one or more signals and a back surface that absorbs the one or more signals, wherein the reflection structure also comprises a plurality of motors for individually rotating each of the plurality of corner reflectors about an azimuth axis of the reflection structure, and wherein the plurality of corner reflectors are positioned at different vertical elevation levels along the reflection structure;
receiving echo signals at the radar at least one of the plurality of corner reflectors that has been rotated to an ON position where the front surface is positioned toward the radar;
collecting data associated with the echo signals received from at least one of the plurality of corner reflectors that has been rotated to the ON position;
identifying peak signal values based on the collected data; and
calculating a radar pitch angle of the radar based on the peak signal values.

9. The non-transitory computer-readable medium of claim 8, wherein when the at least one of the plurality of corner reflectors is transitioned to the ON position the remaining plurality of corner reflectors are rotated to an OFF position where the back surface is positioned toward the radar.

10. The non-transitory computer-readable medium of claim 8, wherein the front surface comprises two or more reflective surfaces, and wherein the back surface comprises anechoic foam.

11. The non-transitory computer-readable medium of claim 8, wherein the radar pitch angle is calculated based on a height and a distance to the each of the one or more corner reflectors.

12. The non-transitory computer-readable medium of claim 8, wherein the peak signal values are determined by sampling different points on a sensitivity curve of the radar.

13. The non-transitory computer-readable medium of claim 8, wherein the collected data includes signal to noise ratio (SNR) data.

14. The non-transitory computer-readable medium of claim 8, wherein the peak signal values indicate a high radar sensitivity.

15. A method comprising:
transmitting, by one or more processors, one or more signals towards a reflection structure comprised of a plurality of corner reflectors each including a front surface that reflects the one or more signals and a back surface that absorbs the one or more signals, wherein the reflection structure also comprises a plurality of motors for individually rotating each of the plurality of corner reflectors about an azimuth axis of the reflection structure, and wherein the plurality of corner reflectors are positioned at different vertical elevation levels along the reflection structure;
receiving echo signals at a radar from each at least one of the plurality of corner reflectors that has been rotated to an ON position where the front surface is positioned toward the radar;
collecting data associated with the echo signals received from at least one of the plurality of corner reflectors that has been rotated to the ON position;
identifying peak signal values based on the collected data; and
calculating a radar pitch angle of the radar based on the peak signal values.

16. The method of claim 15, wherein when the at least one of the plurality of corner reflectors is transitioned to the ON position the remaining plurality of corner reflectors are rotated to an OFF position where the back surface is positioned toward the radar.

17. The method of claim 15, wherein each of the one or more corner reflectors comprises a front surface and a back surface, wherein the front surface comprises two or more reflective surfaces, and wherein the back surface comprises anechoic foam.

18. The method of claim 15, wherein the radar pitch angle is calculated based on a height and a distance to the each of the one or more corner reflectors.

* * * * *

UNITED STATES PATENT AND TRADEMARK OFFICE
CERTIFICATE OF CORRECTION

PATENT NO. : 11,656,326 B2
APPLICATION NO. : 17/027468
DATED : May 23, 2023
INVENTOR(S) : Jonathan C. Berry et al.

It is certified that error appears in the above-identified patent and that said Letters Patent is hereby corrected as shown below:

In the Claims

Claim 13 should read
13. A non-transitory computer-readable medium storing computer-executable instructions which when executed by one or more processors result in performing operations comprising:
transmitting one or more signals from a radar towards a reflection structure comprised of a plurality of corner reflectors each including a front surface that reflects the one or more signals and a back surface that absorbs the one or more signals, wherein the reflection structure also comprises a plurality of motors for individually rotating each of the plurality of corner reflectors about an azimuth axis of the reflection structure, and wherein the plurality of corner reflectors are positioned at different vertical elevation levels along the reflection structure;
receiving echo signals at the radar from at least one of the plurality of corner reflectors that has been rotated to an ON position where the front surface is positioned toward the radar;
collecting data associated with the echo signals received from at least one of the plurality of corner reflectors that has been rotated to the ON position;
identifying peak signal values based on the collected data; and
calculating a radar pitch angle of the radar based on the peak signal values.

Claim 15 should read:
15. A method comprising:
transmitting, by one or more processors, one or more signals towards a reflection structure comprised of a plurality of corner reflectors each including a front surface that reflects the one or more signals and a back surface that absorbs the one or more signals, wherein the reflection structure also comprises a plurality of motors for individually rotating each of the plurality of corner reflectors about an azimuth axis of the reflection structure, and wherein the plurality of corner reflectors are positioned at different vertical elevation levels along the reflection structure;
receiving echo signals at a radar from at least one of the plurality of corner reflectors that has been rotated to an ON position where the front surface is positioned toward the radar;
collecting data associated with the echo signals received from at least one of the plurality of corner reflectors that has been rotated to the ON position;

Signed and Sealed this
Twenty-fourth Day of September, 2024

Katherine Kelly Vidal
*Director of the United States Patent and Trademark Office*